March 29, 1966  P. M. RANNOU  3,242,904
NEST FOR EGG-LAYING INSTALLATION
Filed Oct. 7, 1964  2 Sheets-Sheet 1

Inventor
Pierre Marie Rannou
By Stevens Davis Miller & Mosher
Attorneys

March 29, 1966  P. M. RANNOU  3,242,904
NEST FOR EGG-LAYING INSTALLATION
Filed Oct. 7, 1964  2 Sheets-Sheet 2
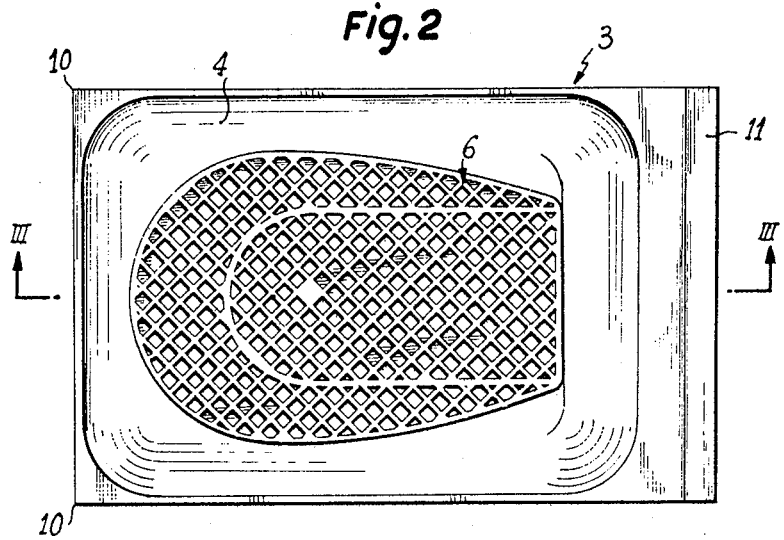
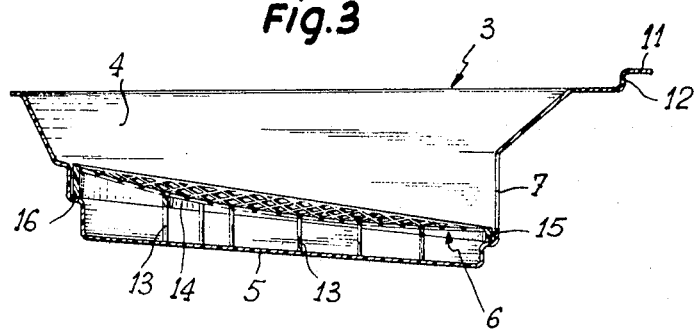
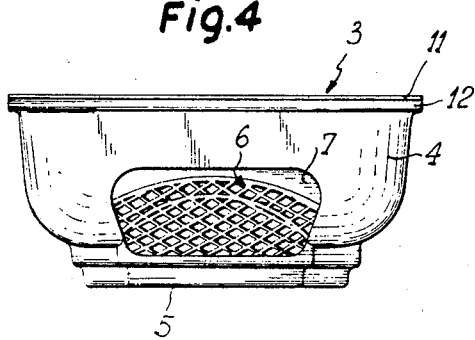
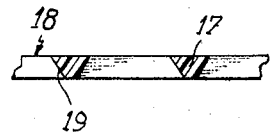
Inventor
Pierre Marie Rannou
By Stevens, Davis, Miller & Mosher
Attorneys United States Patent Office 3,242,904
Patented Mar. 29, 1966

3,242,904
NEST FOR EGG-LAYING INSTALLATION
Pierre Marie Rannou, Saint Andre, Ergue-Gaberic-
Quimper, France
Filed Oct. 7, 1964, Ser. No. 402,159
Claims priority, application France, Oct. 10, 1963,
2,027
3 Claims. (Cl. 119—48)

The present invention has for its object a nest for egg-laying installation, more specially for egg-laying installation equipped with an automatic system for collecting the eggs.

One aim of the invention is to provide a new nest for egg-laying installation having altogether the advantages of being easy to manufacture, inexpensive and practically everlasting, of being attractive for the hens so that the hens quickly get accustomed with the new nest, of being, due to its own construction, able to remain clean for a long time and further of being easy to clean, and of allowing the hens to be given sanitary or even veterinary treatments without requiring any special work, without any inconvenience for the hens, and without any risk of spoiling the eggs.

According to the invention, a nest for egg-laying installation is constituted by a basket shaped body with a solid bottom, provided with a perforated insert which is inclined towards a flush aperture in the side wall of the body, through which the laid eggs are to be evacuated towards any known system for collecting the eggs.

Advantageously, the perforated insert is removable, and both pieces, i.e. body and insert, are made of molded plastic material of the same color, preferably yellow or the like.

Such a nest is obviously easy to manufacture and therefore inexpensive.

As the hens see the solid body bottom through the perforated insert, they do not hesitate to lay in the nest, as it occurs in the egg-laying installations where the hens must lay on a grate above an important open space. The attractiveness of the nest is still increased by the fact that the air confined under the hen between the body bottom and the perforated insert has a warmth insulating power, completed by the own insulating power of the molded plastic material. Further, it has been proved by experience that the hens are more attracted by a yellow coloring, probably because it looks out approximately as the straw. All of the above cause the hens to get quickly accustomed with the nest according to the invention, even when they did previously nest and lay on straw nests.

The excrements, the eggs without the shell being broken when laid, and any other dirts brought by the hens in the nest, pass through the perforated insert, which can thus remain clean a long time, and fall into the solid body bottom, which only need to be cleaned from time to time. The collected eggs are consequently practically never dirty.

Finally, one may pour within the nest, on the solid body bottom and under the perforated insert, a disinfectant or insecticide liquid which evaporates as a result of the warmth generated by the hen and penetrates the plumage thereof, without inconvenience for the hen nor impairing the quality of the eggs. One can also pour a volatile liquid medicament, for instance for the treatment of the hen bronchi maladies.

Another aim of the invention is to provide a nest for egg-laying installation of the above type, with a perforated insert the cleaning of which is automatically ensured merely by the movements of the hens laying in the nest.

To this end, the perforated insert is constituted by a grate with bars the upper surface of which forms a continuous surface, and the cross-section of which presents at all points a sharp acute angle adjacent to said continuous surface.

Due to this feature, the excrements or other dirts laid upon said continuous surface of the perforated insert fall directly into the solid bottom of the body when they are swept by the hen stirring in the nest, without adhering to the sides of the bars because they are cut by said sharp acute angle. It has been proved by experience that such a perforated insert remains substantially clean, and that, in the contrary, with a grate having for instance round cross-section bars, the spaces between the bars are soon obstructed by the dirts which dry and gather on the sides of the bars.

These and other advantages and objects of the present invention will be readily apparent to those skilled in the art from a consideration of the following description taken in connection with the appended drawings.

FIG. 2 is a plan view of the nest according to the invention;

FIG. 3 is a cross-section along the line III—III of FIG. 2;

FIG. 4 is a front view of the nest according to the invention, and

FIG. 5 is an enlarged detail in cross-section of the perforated insert of the nest according to the invention.

Figure 1:
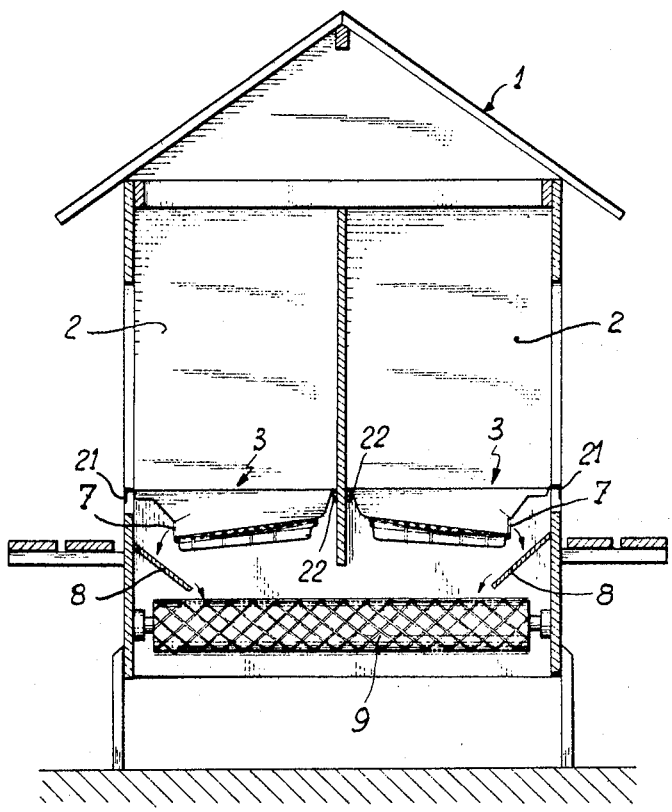
FIG. 1 is a simplified cross-section of an egg-laying installation equipped with a nest according to the invention.

The egg-laying installation 1 comprise several boxes 2, each with a nest 3 fitted therein.

The nest 3 is, according to the invention, constituted by an oblong basket shaped body 4 having front, rear and side walls with a solid bottom 5, provided with a perforated insert 6 which is inclined towards a flush aperture 7 in the front wall of the body 4, through which aperture the laid eggs roll to fall upon a slope and from there upon a collecting endless conveyor 9.

The body 4 has an upper rectangular horizontal ledge the rear corners 10 of which are intended to rest on supports 22 provided in the box 2, and the front part of which comprises a raised horizontal portion 11 intended to rest on a front support 21 of the box 2, and a vertical portion 12 which forms an abutment against said front support 21.

The perforated insert 6 is supported upon the solid bottom 5 of the body 4 by feet 13 relied by a reinforcement rib 14, and, upon a shoulder 16 of the body 4, by a peripherical rib 15.

The perforated insert 6 is constituted as a grate with bars 17, the cross-section of which is clearly shown by the FIG. 5. The upper surface of the bars forms a continuous surface 18, and their cross-section presents at all points sharp acute angle 19 adjacent to said continuous surface 18.

While a particular embodiment of this invention has been illustrated and described herein, it is intended that this invention be not limited to such disclosure, and changes and modifications can be made and incorporated within the scope of the claims.

What is claimed is:

1. A poultry nest assembly comprising a nest housing comprising at least one compartment having means for supporting a nest therein, a removable egg-laying fowl nest mounted in each of said compartments on said supporting means, said removable nest consisting of a pan having a bottom and a front, a rear, and two lateral walls, the upper edges of which form a substantially rectangular contour, a one-piece perforated flat insert of suitably molded plastic material removably supported in said pan at a predetermined distance spaced above said bottom of said pan in a position slanting downwardly from said rear wall to said front wall, the rear portion of said perforated flat insert being substantially semi-circular in shape, the perforations of said insert having areas which are increasingly larger from the smooth top face down to the lower face of said insert thus forming sharp acute angle edges with the top face of said insert, the portion of said rear wall rising from the level of said insert to the upper edge of said rear wall being inclined upwardly and rearwardly, the upper portions of said lateral and front walls also being inclined upwardly and outwardly to form with said upper portion of said rear wall and a flaring inner contour for the nest, the portion of said front wall above said insert being substantially vertical and having therein a central aperture for permitting egress by gravity of eggs laid by a fowl in said nest.

2. A nest for laying installation, more especially egg-laying installations equipped with an automatic means for collecting eggs comprising a basket-shaped body having a solid bottom and a flush aperture in one wall thereof, said aperture being directed towards the means for collecting the eggs, a perforated planar insert removably mounted within said basket spaced from said bottom and inclined towards said aperture, said basket-shaped body and the perforated insert being made of a molded plastic material, the upper portion of said basket body above said insert flaring outwardly, said perforated insert comprising a grate of bars the upper surface of each bar forms a planar surface and the cross section of each bar is trapezoidal with the broader base directed upwardly thereby presenting at all points a sharp acute angle adjacent to said planar surface.

3. A poultry nest assembly comprising a nest-housing having at least one compartment therein, support means in each said compartment for supporting a nest, a removable egg-laying fowl nest mounted in each of said compartments supported on said support means, said removable nest consisting of a substantially rectangular pan having front, rear, and two lateral walls joined by a bottom, a one-piece perforated flat insert removably supported in said pan spaced above said bottom in a position slanting downwardly from said rear wall to said front wall, the rear portion of said perforated flat insert being substantially semi-circular in shape, the perforations of said insert being defined by a grid of bar portions each having a cross sectional area which is trapezoidal with the larger base on the upper surface of said insert thereby forming sharp acute angle edges with said surface, a substantially centrally located aperture in said front wall for permitting egress by gravity of eggs laid by a fowl in said nest.

References Cited by the Examiner

UNITED STATES PATENTS 2,695,006  11/1954  Tellefson _____ 119—48
3,011,477  12/1961  Bressler et al. _____ 119—48
3,046,940  7/1962   Kurtz _____ 119—48

ALDRICH F. MEDBERY, *Acting Primary Examiner.*

HUGH R. CHAMBLEE, *Examiner.*